July 17, 1962 R. G. HILBERT 3,044,247
HIGH SPEED FALSE TWISTER SPINDLE AND MACHINE
Filed June 16, 1958 6 Sheets-Sheet 1

INVENTOR.
RICHARD G. HILBERT
BY
Albert P. Davis
ATTORNEY

July 17, 1962  R. G. HILBERT  3,044,247
HIGH SPEED FALSE TWISTER SPINDLE AND MACHINE
Filed June 16, 1958  6 Sheets-Sheet 4

INVENTOR.
RICHARD G. HILBERT
BY
*Albert C. Davis*
ATTORNEY

INVENTOR.
RICHARD G. HILBERT
BY
Albert P. Davis
ATTORNEY

INVENTOR.
RICHARD G. HILBERT
BY
ATTORNEY

United States Patent Office 3,044,247
Patented July 17, 1962

3,044,247
HIGH SPEED FALSE TWISTER SPINDLE
AND MACHINE
Richard G. Hilbert, Smithfield, R.I., assignor to Leesona
Corporation, a corporation of Massachusetts
Filed June 16, 1958, Ser. No. 742,234
10 Claims. (Cl. 57—77.45)

The present invention relates to textile machinery and is directed more particularly to a machine for imparting false twist to a strand of yarn.

In recent years, much attention has been given by the textile art to the so-called "crimped" synthetic yarns. As is well known, these yarns have been mechanically treated to assume a crimped or coil-like configuration so that they have a certain inherent elasticity and bulkiness that distinguishes them from untreated yarns. These properties cause them to be highly desirable for certain applications in which they have encountered unusual consumer acceptance.

A variety of techniques have been proposed for imparting a crimped structure to synthetic yarns but at the present time only one of these techniques is being practiced on a widespread scale. This procedure involves twisting the yarn, setting the twist, and untwisting the set yarn in a continuous operation without interruption between the individual steps. The continuous twisting and untwisting is accomplished by passing the yarn through a rotating body having some means for engaging the yarn to prevent free twist migration, rotation of the body imparting twist in one direction in the yarn on one side of the body and twist in the opposite direction on the other side thereof. Thus, an apparent or temporary twist is inserted in the yarn and is immediately removed therefrom as the yarn travels past the body. Spindles adapted for this operation have come to be known as "false twist" spindles in contrast to "true twist" spindles which rotate either the delivery or take-up yarn packages.

It is quite apparent that as the speed of rotation of the false twist spindle is increased, a higher number of turns per inch of temporary twist is imparted to the yarn, or else the yarn can be given the same number of turns while passing through the spindle at a higher linear speed. Recognizing this, workers in the art have attempted in various ways to effect a material increase in the speed of rotation of false twist spindles. For example, it has been proposed to utilize the principle of electric motors by constructing the spindle or yarn-engaging body as the armature of an electric motor. This proposal requires a separate electric motor for each strand of yarn being processed, which is prohibitively expensive for large scale production. Again, it has been proposed to float the spindle on jets of air inclined so as to exert a rotational as well as vertical force on the spindle. Such an arrangement requires extremely careful balancing of the forces involved, and of the jets acting on the spindle, which are usually quite numerous. Moreover, the consumption of compressed air in operating a large number of these spindles is enormous and compressed air is an expensive commodity. Conventional twister-spindles can, of course, be modified for operation at higher than usual speeds as by the use of improved bearings and other known expedients, but even when modified they have not been capable of obtaining speeds of much over 50,000 r.p.m. Unfortunately, at these speeds, which are not nearly so high as is desired, bearing failures are excessive and power consumption high despite the use of elaborate driving means.

The principal object of the present invention is, therefore, to provide a false twister spindle which is lightweight but of durable construction and is capable of operating at exceptionally high speeds of rotation, for instance, 150,000 r.p.m. or higher.

Another object of the invention is to provide a false twist spindle having a novel bearing arrangement which permits extreme rotational speeds without exceptional wear or overheating.

Another object is to provide a lubrication system for the bearings of the invention which system supplies the correct amount of lubricant for extremely high speeds of rotation, improving bearing life.

A further object of the invention is to provide a self-contained high-speed spindle, bearing, and lubrication system in a compact unit which can be associated in close proximity with other similar units.

A further object of the invention is to provide a machine embodying a plurality of the high-speed false-twister units of the present invention, and including means for driving these spindles efficiently and economically.

A still further object of the invention is to provide a machine of the type described wherein means are provided for reducing the load sustained by the high speed members of the driving arrangement.

An additional object of the invention is to provide a unitary high speed false twister spindle, bearing and lubrication system which is adapted for use in the conversion of existing machines with a minimum of expense and mechanical complexity.

Other objects and advantages will be apparent from the following detailed description of illustrative embodiments of the invention when read in conjunction with the accompanying drawings in which.

In general, the high speed false twister spindle of the invention comprises a small, lightweight tubular spindle rotatably supported adjacent the ends thereof in a housing. Bearings of special design are interposed between the housing and spindle to permit the attainment of extreme speeds of rotation without bearing failure, undesirable wear on parts or high frictional heat and means are provided for supplying limited amounts of lubricant to the bearing. In one practical embodiment, a plurality of spindle and housing assemblies are arranged in a single multi-position machine, the drive for the machine being particularly adapted for use with the assemblies including a main driving belt of sturdy construction and lighter-weight secondary belts driven from the main belt and having driving contact with groups of spindles. Means are provided for further reducing the effective load placed on the secondary belt at any given point.

In other embodiments, the spindle and housing assembly takes the form of a conversion unit for use in adapting existing twisting machines to the practice of the invention. These units replace elements of existing machines with a minimum of expense and mechanical difficulty, the high speed spindles being driven in one of several ways from the conventional twister spindles at appropriately increased rate of rotation.

Alternative arrangements for journaling the spindle in the housing are contemplated.

Turning now to a detailed description of the invention, reference is made to FIGS. 1 through 4 of the drawings wherein a preferred embodiment of a single false twist spindle and housing unit is disclosed. Each unit, which may be given the general designation 10, consists essentially of a spindle blade 12, a housing 14, and journals or bearings 16, therebetween. Housing 14 is preferably in the form of a generally C-shaped metal block having a thick flat back portion 18 and a pair of legs 20a, 20b extending from the ends of the back portion the base or lower leg 20b being somewhat thicker than the upper leg 20a longitudinally of the block. The corners of the block may be rounded for sake of appearance. Coaxial, cylindrical bores 22a and 22b of equal diameter pass through legs 20a and 20b, respectively, the axis of the bores being parallel to the plane of back portion 18.

Figure 1:
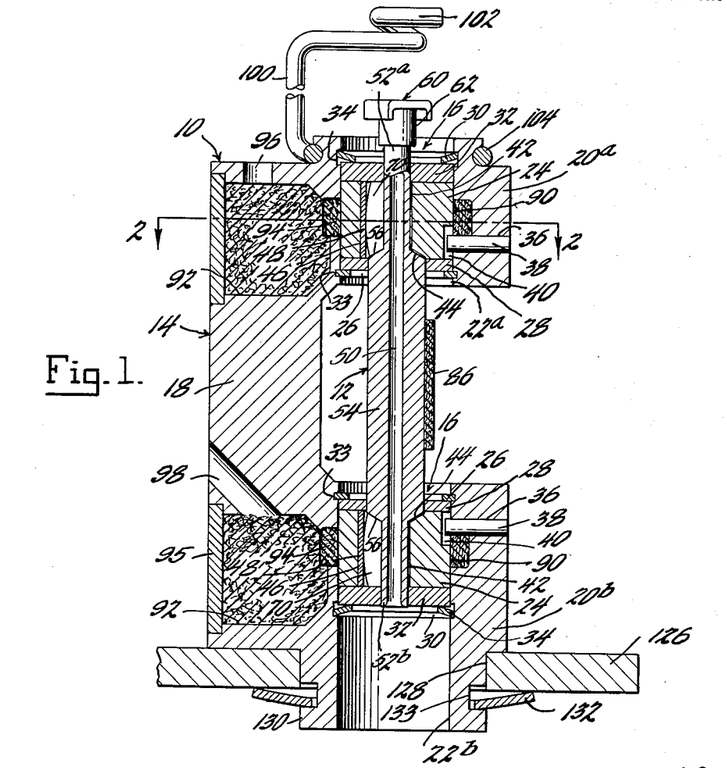
FIGURE 1 is an enlarged detail view of a spindle and housing unit of the present invention, taken in vertical cross-section generally along line 1—1 of FIGURE 2.
Figure 2:
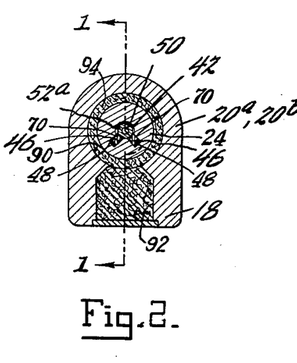
FIGURE 2 is a horizontal cross-sectional view, somewhat reduced in scale of the unit of FIGURE 1, taken generally along line 2—2 of FIGURE 1.
Figure 3:
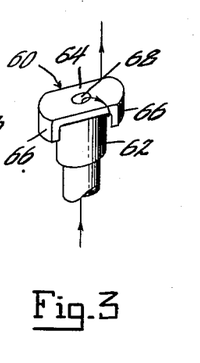
FIGURE 3 is a perspective view, slightly enlarged, of the yarn engaging cap in operative association with the upper end of the spindle blade, showing the path of the yarn relative to the head.

Each of the bores 22a and 22b is adapted to receive a cylindrical, plug-like bearing mount 24 which is fabricated from porous material, for example, sintered bronze or the like, the two mounts being generally identical in configuration and having a diameter slightly less than the diameter of bores 22a and 22b to facilitate their insertion therein. Inwardly of housing block 14, i.e. in the direction of the central opening of the C, mounts 24 are held in the bores by means of split-retaining rings 26, an annular spacing washer 28 being disposed between each ring and mount to seal the mount from dust and the like. Towards the outer ends of the bores, the mounts are held against axial movement by means of bowed or dished retaining rings 30, annular spacing washers 32 being again provided between the rings and mounts as a dust shield and also to transmit thrust from the mounts to housing block 14. The retaining rings 26 and 30 engage internal grooves 33 and 34 respectively provided for that purpose in the walls of the bores. It is necessary that each of the bearing mounts 24 be accurately positioned radially as well as axially with respect to the bores and to this end a small cylindrical passage 36 extends transversely to the axis of the bores through the annular wall of each of legs 20a, 20b. A positioning pin 38 in inserted into each of these transverse passages until the internal end of the pin engages a recess 40 provided in the outer surface of each mount.

Each bearing mount 24 has a small central axially directed bore 42 coaxial with bores 22a and 22b, the internal ends of these small central bores being outwardly flared at a relatively large acute angle as at 44. Two substantially identical slots or channels 46 are cut into the internal wall of each mount bore 42, extending longitudinally the full length of the wall, with their axes parallel to the bore axis, and radially into the wall a distance equal to approximately one-half of the radial thickness of mount 24. There is disposed against the bottom wall of each slot 46 a thin metal strip or plate 48 roughly coterminous with the slot. As can be best seen in FIGURE 2, the two slots in each mount 24 are preferably arranged with their center lines spaced 90° from each other and 135° from the axis of positioning pin 38. The slots are also preferably symmetrical with reference to a plane passed through the axis of bore 42 perpendicular to the plane of the back portion 18 of housing 14. Where the positioning pin is equidistant from the slots, as just described, the axis thereof will coincide with this plane.

Spindle blade 12 is of generally elongated cylindrical configuration having an axial bore 50 extending through the full length thereof for passage of the yarn, the mouth at the lower end of the bore being flared. Adjacent each end, the diameter of the blade is substantially reduced as compared to its normal diameter, the reduced end portions 52a, 52b serving as bearing surfaces or gudgeons for the spindle while the mid-portion 54 functions as a whorl. At the transition of the mid-portion to each end-portion is a shoulder 56 tapering at an angle roughly complementary to the angle of the flared internal ends 44 of bores 42 in mounts 24.

When the false-twister unit of the invention is assembled, the spindle blade 12 is supported by housing 14 with the reduced end portions received within the mount bores 42 so that the spindle bore is concentric with the housing bores 22a and 22b. The lower end 52b of the spindle blade terminates approximately flush with the lower of the external spacing washers 32 while the upper end projects above the upper of these washers and retaining ring 30 to accommodate a yarn-engaging cap or head 60 (see FIG. 3), preferably formed of wear-resistant material. This cap includes a downwardly opening socket 62 fitting over the free end of the blade, a transverse flange 64 at the upper end of the socket portion, and two segments 66 projecting downwardly from diametrically opposed portions of the edge of the flange. A central axial aperture 68 is formed in cap 60. This aperture is, in effect, a continuation of bore 50, having a diameter substantially the same as that of bore 50. The edges of aperture 68, flange 64 and segments 66 are all rounded to minimize wear and tear on the yarn.

Reference has already been made to the presence in each of the bearing mounts of two spaced radial recesses 46 with metal plates 48 in the bottoms thereof. These recesses are adapted to receive identical bearing segments 70 which are disposed in pairs in the bearing mount and constitute journals for the reduced end portions of spindle blade 12. Segments 70 are formed of hard wear-resistant material, precious stones of natural or synthetic origin, such as sapphire, being preferred, although highly wear-resistant metal can be substituted where increased frequency of replacement is permissible.

Figure 4:
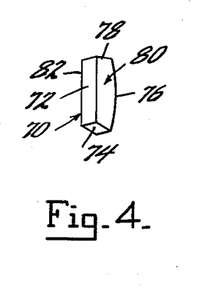
FIGURE 4 is a perspective view of a preferred form of bearing segment for rotatably supporting the spindle blade.

As can be best seen from FIGURE 4, each of these segments is roughly in the shape of a truncated, right angular, rectangular prism, having a total of six sides. For the purpose of the invention two adjacent sides 72 and 74 constitute planar bearing faces, receiving the bearing load of the end portions 52a, 52b and tapered shoulders 56 of the spindle blade. The lesser of these two sides, 74, intersects with the greater 72 at an obtuse angle approximately equal to that at which the ends of mounting bores 42 flare outwardly and complementary with the taper of shoulders 56. Side 76, opposite side 72, has a large convex radius of curvature and is adapted to seat against the metal strip 48 in the bottom of recess 46. The curvature of this side permits the segment to align itself in the recess with its bearing faces in proper contact with the corresponding surfaces of the spindle blade and avoids the necessity of forming the two opposite greater sides in exact parallel. Due to its curvature, side 76 can have only theoretical line contact with any plane surface against which it abuts and the function of metal plate 48 is to receive the concentrated load from the curved rear face of the segment and distribute it over the bottom of the radial recess in the porous mount. Where the segment and mount can be modified such that the load receiving and transmitting surfaces thereof are closely parallel to the axis of the spindle and to each other, plate 48 may be dispensed with.

Opposite to the inclined end face 74 is side 78 extending generally perpendicular to the greater bearing face 72. When positioned in the bearing mount this side is generally coterminous with the outer transverse end face of mount 24, as is readily apparent in FIGURE 1. The segment is completed by the two remaining faces 80 and 82 which are substantially parallel to each other and substantially perpendicular to all other sides.

The longitudinal and transverse dimensions of the segments are such that they are not wholly received within the recesses 46 but rather have their greater bearing faces 72 extending chordally with respect to the mount bore 42. This insures that the bearing load is borne by the segments rather than the internal surface of the bore. The diameter of the mount bores is sufficiently greater than that of the reduced end portions 52a, 52b of the spindle blade that a discernable clearance exists between the spindle surface and the surface of the bores. When the spindle is inactive, there is a small amount of lateral "play" in the spindle; however, rotational driving force, for instance of a belt 86, is transmitted to the spindle blade in such a way as to urge the spindle blade end portions into contact with the radial bearing faces 72 of the cooperating parts of the segments and away from the internal surface of mount bore 42. Similarly, the inclined bearing faces 74 are slightly raised above the flared end faces 44 of the porous mount.

From the foregoing description, it will have been comprehended that each cooperating pair of segments 70 define a combination V-type radial and thrust bearing. The radial load is transmitted from the spindle through reduced end portions 52a, 52b, segments 70, and load distributing plates 48, to bearing mounts 24 and thence to the housing block 14. The inclined segment bearing faces 74 receive from the tapering spindle shoulders the axial thrust in either direction of the spindle and transmits the thrust through washers 32 and retaining rings 30 directly to the housing. While the radial bearing faces 72 of each pair of segments are preferably arranged at a right angle to each other, a different angle, except 180° can be used in lieu thereof.

The extreme high speeds at which the spindle of the invention is to be rotated make the provision of a lubrication system desirable if burned-out parts are to be avoided. On the other hand, the usual practice of allowing the rotating members to have direct contact with a lubricant cannot be followed since direct contact with lubricants at the speeds in question would actually have a retarding effect on spindle rotation. It has been found that satisfactory lubrication may be obtained by having the spindle rotate in spaced non-contacting relationship with material permeated by lubricating oil. In this way, positive contact between the lubricant and rotating spindle surfaces is avoided but a sufficient amount of the oil or oil vapor is picked up by the rotating spindle surfaces, possibly due to their high speed relative to the stationary oil-permeated mass, to effectively lubricate the blade end portions.

The above-described feature is accomplished in the present invention by giving the generally cylindrical porous bearing mount access to a supply of lubricating oil in order that the mount become permeated by such oil. As can be seen from FIGURE 1, such access is obtained by forming in the interior wall in each of the bores 22a, 22b an annular recess 90 extending into the housing legs 20a, 20b. Each of the annular recesses 90 is in communication with an oil reservoir chamber 92, one of the chambers being formed adjacent the upper end of the back portion 18 of the housing block and the other adjacent the lower end thereof. Annular recesses 90, and preferably the reservoir chambers 92 as well, are filled by oil-absorbent felt, indicated at 94, the presence of the felt retarding the flow of oil through the sintered bearing mount and tending to prevent a condition of over-lubrication. Chambers 90 may be conveniently obtained by drilling into back portion 18 of the housing from the rear face thereof and pressing a plug 95 into the end of the opening.

Any appropriate means may be provided for filling the oil reservoir chambers, such as a passageway 96 extending upwardly from the upper chamber to the top face of housing block 14 and a passageway 98 extending upwardly and outwardly from the lower reservoir chamber to the back face of the block.

It is well known that yarn undergoing bodily rotation tends to balloon outwardly due to centrifugal force, which may lead to yarn entanglement where a plurality of strands of yarn have closely adjacent paths. Objectionable ballooning may be prevented by having suitable guide means restrain the yarn after passage around the yarn engaging head. It is advantageous from the standpoint of simplicity in assembling the false-twister spindle units of the invention into a machine for each unit to carry its own yarn guide which may take the form of a length of stiff wire 100 having a loop or pig-tail 102 at the upper end thereof in axial alignment of the bore 50 of spindle 12 the lower end of the guide wire being attached to the upper face of the housing block, as at 104.

Figure 5:
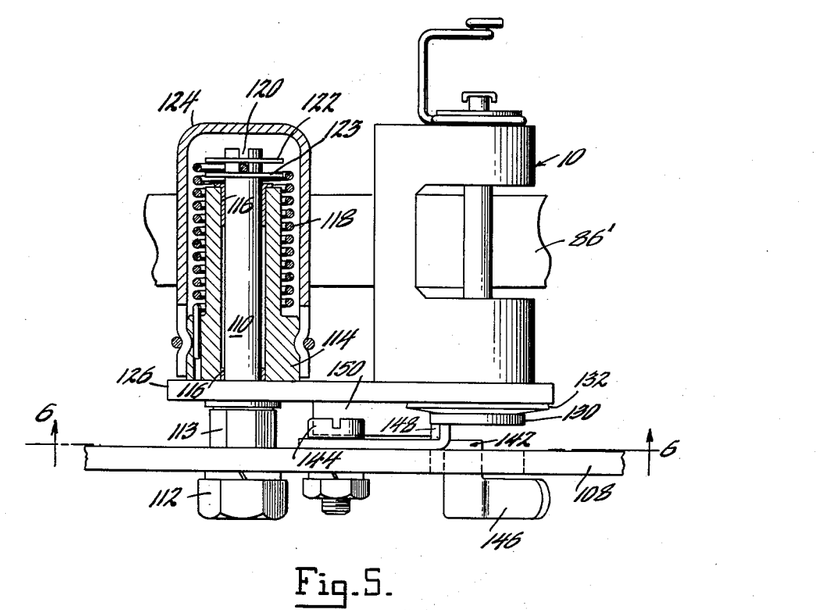
FIGURE 5 is a view in front elevation of the spindle and housing unit of FIGURE 1 in operative association with a swing assembly, the latter being shown partially in section to better reveal its details.
Figure 6:
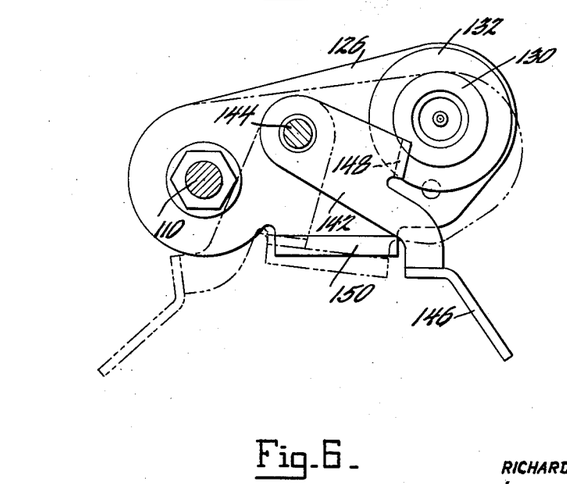
FIGURE 6 is a bottom plan view of the swing assembly taken generally along line 6—6 of FIGURE 5 with the supporting members of the assembly shown in section.

Up to this point, the description of the invention has been confined to a single false-twister spindle unit existing in the abstract, so to speak, that is, independent of any particular combination of elements for mounting or supporting the units in an actual machine. This mode of description was adopted because of the fact that the unit is capable of being mounted in any one of several ways. One such way is illustrated in FIGURES 5 and 6 and is intended to be employed primarily when a new machine, ordinarily including a large number of units, is to be constructed. In this arrangement, the numeral 108 indicates a horizontal frame member of the twisting machine supported in the usual way by means not shown and on which a number of the false-twister spindle units are to be mounted. At appropriate spaced points along the length of frame member 108, a swing post 110 is fixedly secured thereto, the lower end of the post passing through an aperture provided in the member and threadedly engaging a nut 112. Nut 112 is opposed on the opposite side of member 108 by a collar 113 integral with post 110. Swing post 110 is surrounded over the major portion of its length by a sleeve 114 that is rotated freely on upper and lower bushings 116. Encircling sleeve 114 is a torsion spring 118 having one of its ends fixedly connected to the sleeve and the other held in engagement with a diametrical recess 120 formed in the upper end of the post by means of an annular C-ring 122. A second C-ring 123 is spaced on post 110 inwardly of ring 122 to receive the thrust from sleeve 114 and prevent undue axial play in the sleeve. The post, sleeve and spring may be enclosed by a cover 124 having a friction fit with the base of the sleeve.

The false-twister spindle unit 10 is supported for pivotal movement about the swing-post on a swing-plate 126. Adjacent one end of this plate is an aperture not visible in FIGURE 5, which is in press-fitting engagement with the lower end of sleeve 114. A second aperture 128 (see FIGURE 1) is provided adjacent to the other end of the plate for the reception of an extension 130 projecting below the bottom leg of the housing block and having reduced dimensions as compared with the housing. The entire spindle and housing unit is held against vertical movement with respect to swing-plate 126 by means of a dished retaining ring 132 engaging at its inner end a circumferential recess in the extension and bearing at its outer end against the undersurface of swing plate 126. Upon removal of the retaining ring the unit may be lifted from the swing plate to facilitate repair and/or replacement.

For certain purposes, it may be desirable for the housing to be movable between two or more alternative positions to thereby change the direction of the load applied against the bearing segments by the spindle blade end portions. This may be accomplished by providing slight depressions or recesses 134 at suitable locations in the undersurface of housing block 14 (see FIGURES 7 and 8), which recesses may be selectively placed in registration with an aperture 136 extending through swing plate 126. The aperture and desired depression are held in registration by means of a ball 138 pressed into aperture 136 until it projects just past the upper surface of the swing plate. Sufficient yielding action to permit changing the location of the housing is obtained from dished ring 132.

The primary function of the swing assembly is to support the spindle unit for pivotal movement toward and away from driving belt 86' adapted to engage the center whorl portion of spindle blade 12 to rotate the same. A fragment of such a belt is shown in FIGURE 5. When the machine is assembled, torsion spring 118 is pretensioned so as to urge the blade into contact with the driving belt, the tension being sufficient to prevent slippage between the belt and spindle. In order to facilitate disengagement of the spindle from the driving belt, utilization may be made of a disengaging lever 142. As can be seen in FIGURE 6, this lever is pivotally connected at one end to frame member 108 by means of a stud 144 and is formed at the other end with a handle 146 projecting downwardly below the frame member. Intermediate the pivoted end and handle 146 is a turned-up ear 148 which is adapted to engage a down-turned flange 150 at the rear edge of swing plate 126. As the disengaging lever is moved clockwise in FIGURE 6, ear 148 flanges 150 to shift the unit slightly away from the driving belt to an inoperative position shown in dotted lines. When pivoted to the full extent permitted by swing post 110, lever 142 is in an "over-center" position, shown in dotted lines, where it is urged by swing spring 118 through swing plate 126 against post 110. When lever 142 is in "over-center" position, unit 10 is maintained with the spindle whorl portion out of contact with the driving belt even when the lever is released. Movement of the lever counter clockwise past "dead center" permits swing spring 118 to act on swing plate 126 to pivot the unit back into belt engaging position.

It will be appreciated by those skilled in the art that a plurality of spindle and housing units and associated swing assemblies may be organized in the manner customary with twisting machines, that is in two parallel rows, one on each side of the machine, with an endless driving belt located between the rows, driving all of the spindles in both rows, the belt, in turn, being driven from a high speed electric motor. This arrangement, however, presents certain difficulties from a practical point of view. While the torque requirement of an individual unit is quite low compared to a conventional twister spindle, the total or aggregate requirement for a large number of units, say 100, is fairly high.

If the spindles were to be driven directly from a single belt at the speeds contemplated, the linear rate of travel of the belt would be higher than can be tolerated with a large, heavy belt such as is required to transmit the total power load of the machine. A heavy belt ordinarily has irregularities in its surface and tends to whip at high speeds so that it can be held against the whorl portions of the spindle blade only by strong swing pressure. Thus, it has not been possible to find a large, heavy belt from among those presently commercially available that will operate satisfactorily.

Figures 7, 8, 9, 10:
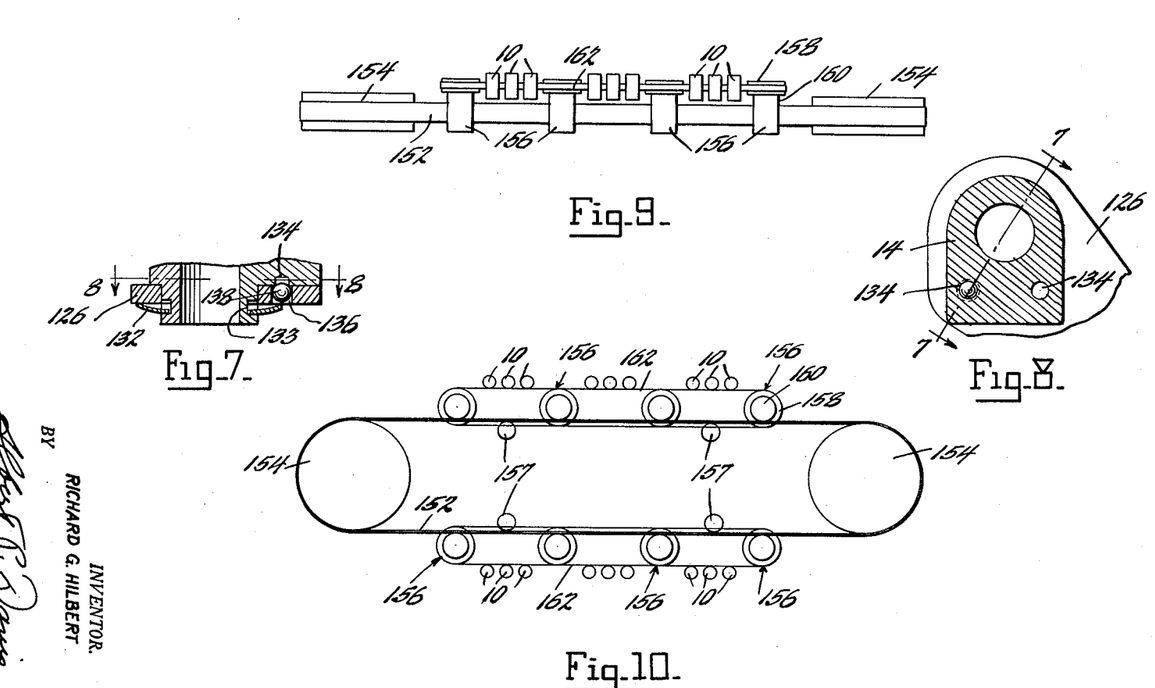
FIGURE 7 is a fragmentary vertical elevation of the unit of FIGURE 1 taken generally along line 7—7 of FIGURE 8.
FIGURE 8 is a horizontal section similar to FIGURE 2 but taken along line 8—8 of FIGURE 7.
FIGURES 9 and 10 are front elevation and bottom plan views, respectively, of a preferred form of a machine embodying the spindle and housing units of the invention and utilizing an improved drive for the units, the showing being diagrammatic in nature.

For this reason, although the construction of a machine embodying the spindle units of the invention along conventional lines is not considered completely outside the realm of possibility, a modification of the conventional drive to meet the peculiar needs of the invention is considered preferable. On modification that has been found satisfactory is shown in FIGURES 9 and 10, it being understood that the illustration is quite diagrammatic in nature and omits all mechanical details. In this figure, the numeral 152 designates a primary driving belt which is of the heavy durable type normally used in twisting machines, and is arranged in the normal fashion, i.e., in an elongated endless loop with large diameter pulleys 154 at each end of the loop. One of the pulleys is driven by an electric motor, not shown, while the other functions as an idler. There is disposed along each of the two straight stretches of the loop a plurality of pulleys 156. Contact between the main belt and all of pulleys 156 is insured by means of small idlers 157 engaging the opposite sides of belt 152, there being one such idler between each pair of pulleys 156.

Pulleys 156 are of the compound type, having a large diameter portion 158 and a small diameter portion 160, the primary driving belt having driving contact with the small diameter portion. The large diameter portion of the pulleys is in driving contact with a high-speed secondary driving belt 162. Preferably, more than one of the secondary belts is used, each having a path in the shape of an elongated endless loop and encompassing a plurality or group of the compound pulleys on one side of main belt 152. The end or terminal pulleys of the group are in contact with the secondary belt through an arc of roughly 180° while the remaining intermediate pulleys have opposite sides in tangential contact with the belt. In the illustrated arrangement, only one plurality or group of compound pulleys and associated secondary driving belts is shown on each side of the main driving belt, but it will be appreciated that a number of these groups can be utilized. Also, the number of pulleys in each group may vary from that specifically illustrated. The compound pulleys in each group are spaced at intervals along the straight stretch of the main driving belt so that the secondary belt upon leaving one pulley is unsupported for a distance before contacting another pulley. Between each pair of adjacent pulleys 156, a group of the spindle units 10, of the invention are arranged in a straight line adjacent the unsupported stretch of the secondary belt so that when in operative position the whorl portions of the spindle are in driving contact with the belt. The number of spindles between the pairs of pulleys and contacting a single unsupported stretch of the secondary belt may, naturally, be varied.

This spindle driving arrangement has characteristics particularly desirable for high speed spindles. The main belt has no direct contact with the spindle blades; the fact that this belt may not run smoothly is, therefore, immaterial. A large heavy main belt, capable of transmitting the total power required for all units, can, hence, be utilized without deleteriously affecting the performance of the machine. The maximum tension in secondary driving belt 162 need be only sufficient to transmit the power being consumed by the group of spindle units 10 mounted between an adjacent pair of pulleys 156 as it is given fresh driving impetus by a pulley 156 before encountering the next group of units. Therefore, spindle driving belt 162 can be thin, flexible and readily capable of high speed travel. Such a thin, flexible, low-tension belt requires only a small pressure against the spindle whorl in a normal direction to impart rotation to the spindle blade. Operation of the machine with light belt pressure results in the further advantage of light loading of the spindle bearings.

In brief, the organization illustrated in FIGURES 9 and 10 divides the drive into a low-speed, high-load stage and a high-speed, low-load stage, and the load transmitting elements for each stage can be selected to meet the particular requirements of that stage and need not be expected to function over an almost impossible range of conditions. It will be understood that in this organization the spindle units shown diagrammatically and indicated by the numeral 10 will actually be in the form of the complete assembly of FIGURES 5 and 6.

The false twist spindle unit of FIGURES 5–10 is operated in the following manner. To thread the spindle blade, lever 142 is pivoted towards swing post 110, pivoting swing plate 126 and spindle unit 10 away from belt 162 (86' in FIGURES 5 and 6). A suitable threading needle or snake is attached to a strand of yarn from a suitable supply package, not shown, and passed through the spindle bore 50, drawing the yarn through the bore and opening 68 in cap 60. The strand of yarn is then wrapped around and under flange 64 so that when threaded through yarn guide 102 it is retained beneath the down-turned lip 66. Next, the strand is attached to any suitable yarn take-up mechanism, not shown. By means of the cooperating ball and socket the position of housing may be adjusted relative to plate 126 until the pairs of bearing segments 70 are disposed symmetrically about a plane passed through the spindle blade axis perpendicular to the spindle driving belt. Segments 70 are, of course, on the opposite side of the spindle blade from the belt. Alternatively, the housing may be *positioned* so that the radial bearing face of one segment of each pair is parallel to the belt while the same face of the other segment is normal to the belt on the side of the spindle in the direction of travel of the belt. When the strand is properly threaded, lever 142 is then pivoted away from post 110 whereupon spring 118 pivots swing plate 126 about post 110 until whorl portion 54 of the spindle blade contacts the driving belt.

There are in use at the present time false twister machines utilizing older, low-speed spindles, and it would be a considerable convenience and saving to owners of these older machines if the same could be modified in accordance with the present invention. Obviously, it is not practical to include in the present description a discussion of the changes necessary to adapt the invention for every type of twisting machine known to be in existence. However, for purposes of illustration, two examples will be given herein where the invention takes the form of a conversion unit for known machines. On the basis of these two examples, those skilled in the art will be assisted in developing ways of adapting the invention to other existing machines.

Figure 11:
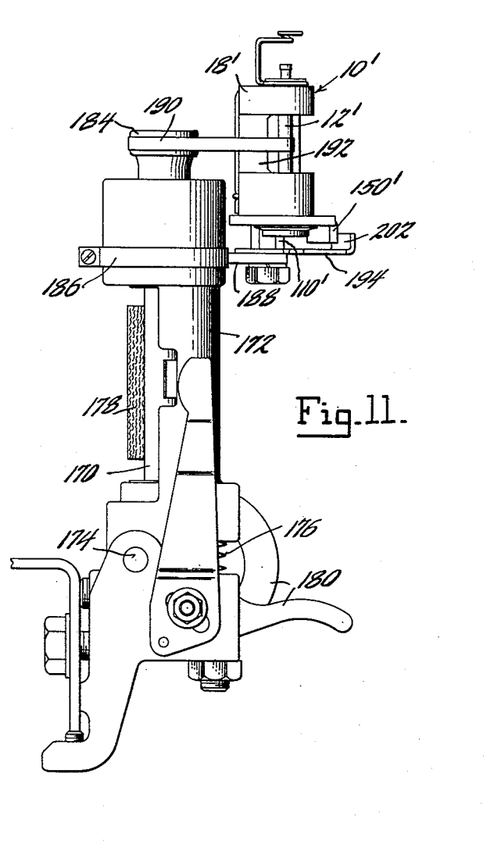
FIGURE 11 is a side elevational view illustrating an adaptation of the invention for use with an existing false twisting machine.
Figure 12:
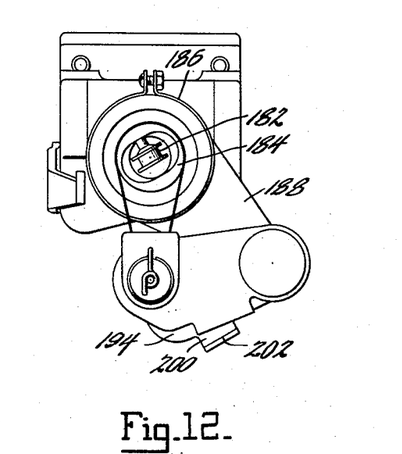
FIGURE 12 is a top plan view of the adaptation of FIGURE 11.
Figure 13:
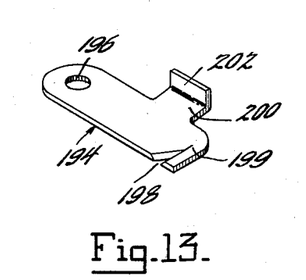
FIGURE 13 is a yarn cutter employed in connection with the adaptation of FIGURE 11.

The first existing machine to be described is that disclosed in United States Patent 2,791,086 to R. G. Hilbert, et al., entitled "Textile Spindle," and for a complete understanding of that machine reference is made to the description to be found in the patent. Briefly, as can be seen from FIGURES 11–13, the spindle of the patent consists of a spindle blade 170 journaled in the more or less conventional bearings, not shown, which are received and supported by a housing 172. The housing is mounted for limited pivotable movement relative to a horizontal axis 174, the housing being biased by a spring 176 to a position where the spindle blade contacts a driving belt 178. Movement of the spindle and housing away from the driving belt is effected by means of a compound lever 180. The upper end of the spindle blade projects above the vertical limits of the housing and carries in the interior thereof a grooved yarn engaging roll 182. Externally, the projecting portion of the spindle blade 170 flares outwardly and terminates in a generally cylindrical end 184, and for the purposes of the present modification, this cylindrical end will be employed as a driving pulley for the spindle blade of the invention. The original end of the patented spindle may be replaced by a crowned pulley if desired. The upper end of the housing 172 is encircled by a clamp 186 to which is secured a bracket 188. Bracket 188, insofar as function is concerned, replaces the frame member 108 already described in connection with the unit of FIGURES 5 and 6. A swing post 110' extends upwardly from bracket 188, being attached at its lower end to the bracket. The details of the swing assembly and of the spindle and housing unit 10' are the same as those already described with the exception that disengaging lever 142 is eliminated as being unnecessary. The whorl portion of the spindle blade 12' is in driving connection with cylindrical end 184 by means of a small thin flexible belt 190 and the torsion spring of the swing assembly, not visible in FIGURES 11–13, is arranged to bias the spindle and housing unit away from end 184. In this way, belt 190 is held under sufficient tension to prevent slippage. The back portion 18' of the housing may be disposed adjacent to the housing 172 of the patented spindle, in which event it should be relieved at the sides, as indicated at 192, to permit free passage of the thin belt. Alternatively, housing portion 18' may be positioned on the opposite side of blade 12' from housing 172 of the patented spindle.

There is, of course, a possibility that the thin, flexible driving belt 190 may rupture during a twisting operation and it is desirable to provide means for preventing untwisted yarn from being thereafter drawn through the stopped spindle blade to the yarn take-up. To this end, a yarn breaker or cutter plate 194 is fixedly mounted on swing post 110' of the swing assembly just above bracket 188. As can be best seen in FIGURE 13, this plate is elongated in shape, having a circular opening 196 adjacent one end and a sharpened notch 198 adjacent the other end. Notch 198 terminates at its inner end with a slit 199 adapted to "trap" the yarn in the event it is not cut by the sharpened edge. Plate 194 may also carry a stop to limit the extent to which the spindle unit may be swung away from the housing of the patented device under the influence of the swing spring. Thus, an extension 200 may be formed on the side of the plate opposite to the housing of the patented device, the termination of this extension being bent upwardly at 202 into the path of the downturned lip 150' on the swing plate. The lower end of swing post 110' fits within opening 196 in the cutter plate. The distance from the axis of plate opening 196 to notch 198 is generally the same as that from the axis of swing post 110' to the bore of the spindle blade 12' and the plate is positioned relative to the spindle blade so that as the spindle unit pivots outwardly upon rupture of driving belt 190 the yarn will be carried into the cutter notch and severed.

Figure 14:
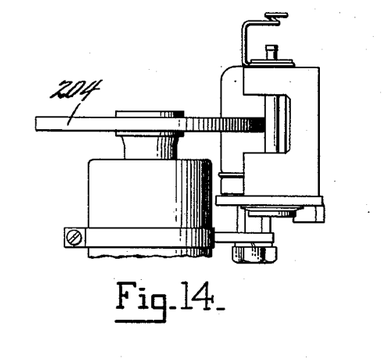
FIGURE 14 is a fragmentary view similar to a portion of FIGURE 11, showing an alternative drive for the spindle blade.

Instead of utilizing a thin, flexible belt to drive the spindle blade, there can be utilized a large disc 204 (see FIG. 14) with a surface formed of hard rubber or other material having slightly yieldable, frictional engagement with the blade whorl. This disc may be secured to the cylindrical end 184 of the spindle of the patented device in any appropriate way, as by a press fit. Of the two drives, the thin flexible belt has been found most satisfactory. Where the friction disc is to be used, the tension in the swing assembly spring must be reversed so as to bias the spindle whorl against the disc.

Figure 15:
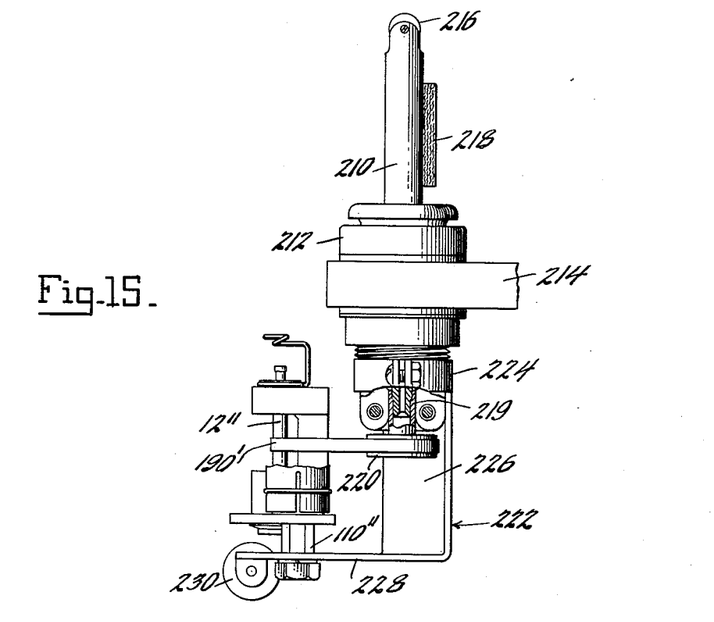
FIGURE 15 is a side elevation of a further adaptation of the invention for use with another existing twisting machine.

The second patented device that is susceptible to modification for false-twisting yarn in accordance with the invention is that disclosed in U.S. Patent 2,829,487 for "Yarn Spindle" to N. J. Stoddard, et al., and again, reference is made to the disclosure of the patent for a complete understanding of the details of the device. Briefly, it includes as shown in FIGURE 15 a tubular spindle 210 journaled for rotation in a housing 212 that is rigidly supported by a frame member 214. The spindle 210 projects above housing 212, the upper end carrying a yarn engaging roll 216 and being in driving contact with a driving belt 218. For the purposes of the modification, the bore in the lower end of housing 212 is enlarged and a short hollow stub shaft 219 is press-fitted onto the extreme lower end of spindle 210, projecting below housing 212. At the free end of stub shaft 219 is a hollow pulley 220 formed integrally with the shaft. A bracket 222 is firmly affixed to the lower end of housing 212 by means of a clamp 224, the bracket having axial and transverse portions 226 and 228, respectively. Swing post 110″ is supported by the transverse portion 228 which has the same function as bracket 188 of the previously described modification. Driving connection between the cylindrical pulley 220 and the whorl of spindle blade 12″ is established through a thin flexible belt 190′, as before, and the swing assembly is biased away from this pulley to maintain the belt in tension.

The yarn path through this patented device is such that a guide pulley 230 must be provided in the normally free end of transverse bracket portion 228 to properly direct the yarn from the bore of the spindle blade of the invention.

Figure 16:
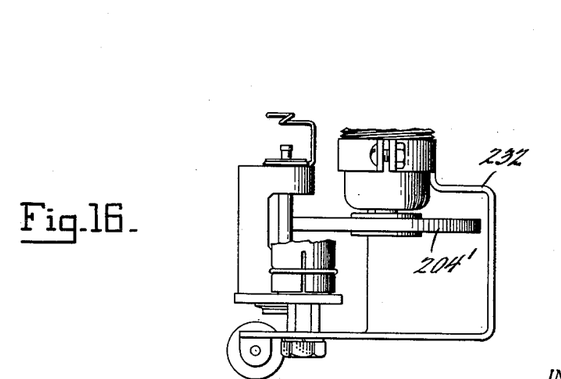
FIGURE 16 is a fragmentary view similar to a portion of FIGURE 15 showing an alternative drive for the spindle blade.

In this modification, driving belt 190′ may also be replaced by a driving disc 204′ making resilient frictional contact with the blade whorl (see FIG. 16) and in this event the axial bracket portion must be displaced transversely, as at 232, to accommodate the disc. Here again, it is believed that the belt is likely to give more satisfactory service.

Figure 17:
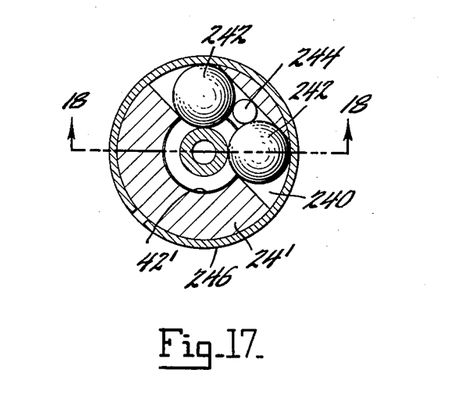
FIGURE 17 is a horizontal sectional view of a modified bearing mount and spindle blade, taken generally along line 17—17 of FIGURE 18.
Figure 18:
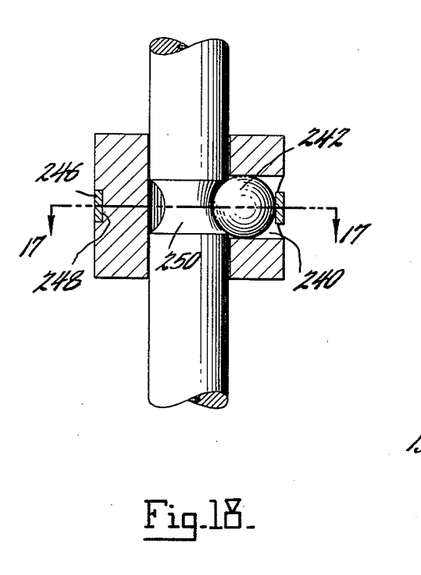
FIGURE 18 is a fragmentary vertical cross-sectional view of the modified mount of FIGURE 17, taken generally along line 18—18 of FIG. 17, with the spindle blade and a bearing segment shown in elevation.

It will be appreciated by those skilled in the art that the bearing segments may have a variety of shapes other than that already described and may be arranged and supported in numerous other ways with respect to the spindle blade and the housing block. No attempt will be made to illustrate and describe all possible variations along these lines as most of them will be more or less obvious and within the skill of the art. There are shown in FIGURES 17–20, however, for the purpose of illustrating the general directions in which these variations may proceed, two modifications which are of more than routine interest. In the arrangement of FIGURES 17 and 18 the bearing mount 24′ is provided with a transverse aperture 240 displaced somewhat from the axis of the bearing mount but communicating with the central bore 42′ provided in the mount for the reception of the spindle blade. Positioned in this transverse passageway is a pair of spherical bearing segments 242 formed of the same hard material as originally described bearing segments 70, segments 242 being maintained in slightly spaced apart relationship by a separating pin 244. To maintain the spherical segments within the passageway, the housing is encompassed by the circular retaining band 246 housed within a circumferential slot 248 in the outer peripheral wall of the mount. A toroidal recess or slot 250 is cut into the spindle blade adjacent the ends thereof the radius of the slot being substantially equal to the radius of segments 242 in order that the segments and slot may mate. A bearing mount and bearing segment assembly, will, of course, be provided at each end of the spindle blade. This organization has the advantage that the spherical bearing segments will continuously creep due to the rotation of the spindle blade and continuously present a new surface for bearing contact with the recessed portion of the spindle blade. Being spherical, segments 242 will receive the thrust as well as the radial bearing load of the spindle blade.

Figure 19:
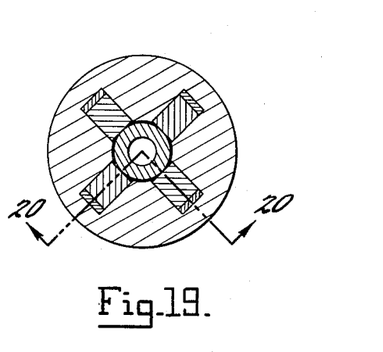
FIG. 19 is a horizontal cross-sectional view of another modified bearing mount, taken generally along line 19—19 of FIG. 20.
Figure 20:
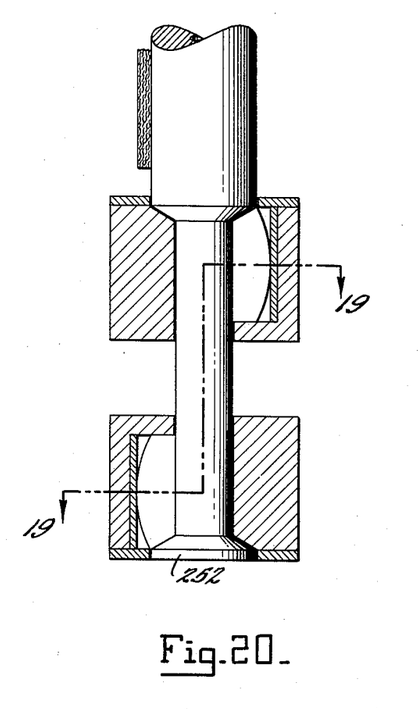
FIG. 20 is a fragmentary vertical cross-sectional view of the modified mount of FIG. 19 taken generally along line 20—20 of FIG. 19, with the spindle blade and bearing segments shown in elevation.

In FIGURES 19 and 20, a cantilevered bearing mount for the spindle blade is illustrated, the bearing mount and segments being disposed in slightly spaced-apart relation at the same end of the spindle blade. Each of the housing and segment organizations is the same as that originally described and further detailed description is deemed unnecessary.

To absorb the thust of the spindle blade in both directions, the bearing mounts face in opposite directions, an outwardly flaring shoulder 252 being formed at the extreme lower termination of the spindle blade to transmit thrust to the lower bearing mount and segments.

No illustration has been given of any particular supply package support and yarn take-up mechanism as it is contemplated that these components will be conventional. For instance, the yarn package may be supported for over-end take-off in the usual manner and the take-up may be a horizontally mounted package rotated by frictional contact with a power drum.

It will be seen that the invention constitutes an effective solution to the problems of false twisting strands of yarn at very high speeds. As a matter of fact, experimental models constructed as described herein have been operated for extended periods at speeds in excess of 300,000 r.p.m.

The variations and modifications to which the present invention is subject are not limited merely to the bearing arrangement and numerous other changes in the design and construction of other aspects will readily occur to the skilled worker. For this reason, the forms of the invention illustrated herein should be considered as exemplary only, the scope of the invention being defined by the hereunto appended claims rather than by what is specifically illustrated and described.

Having thus described the invention, what is claimed as new and desired to be secured by Letters Patent is:

1. A high speed false twist spindle for inserting and removing twist in a moving strand of yarn comprising a spindle blade having at least one portion whose external surface is a surface of revolution and a whorl portion in axial alignment with, adjacent to, and of greater external diameter than said one portion whereby a shoulder portion is formed therebetween, said spindle blade having an axial passageway therethrough for the passage of said moving strand of yarn axially in the direction of said one portion from said whorl portion; means carried by said blade for engaging said moving strand to rotate the same, the axial movement of said strand exerting an axial thrust on said blade in the direction of the strand movement; a bearing for said spindle blade including at least two bearing surfaces formed of hard, wear-resistant material in tangential contact with the external surface of said one portion and at least one other bearing surface formed of hard wear-resistant material in tangential contact with said shoulder portion to take the thrust imposed on said blade by a moving strand of yarn; and means for supporting said bearing surfaces against rotation and axial displacement in the direction of strand movement.

2. A false-twist spindle according to claim 1 wherein said shoulder portion is frusto-conical and said other bearing surface engages said shoulder portion with a line contact.

3. A false-twist spindle according to claim 1 wherein said one portion is cylindrical, and said first and second bearing surfaces are planar and are disposed at an angle of less than 180° to each other, said spindle including drive means engaging said whorl portion to urge said one portion into line contact with both said first and second bearing surfaces.

4. A false-twist spindle according to claim 1 wherein said shoulder portion is tapered and said one portion is cylindrical, and wherein said surfaces are planar, the first and second surfaces being disposed at an angle less than 180° to each other and said other surface being disposed at an angle to one of said first and second surfaces complementary with the taper of said shoulder portion whereby said surfaces are adapted to engage the corresponding blade portions with line contacts, said spindle including drive means engaging said whorl portion and yieldingly urging said blade into said line contacts with said surfaces.

5. In a high speed textile spindle, the improvement comprising a mounting of porous, substantially rigid material having a bore therethrough; a spindle blade having a cylindrical portion extending into said bore; at least one bearing insert housed in said mounting and providing two bearing faces in tangential contact with said blade portion, said faces being disposed within the interior of said bore so that the loci of contact of the faces thereof with said blade portion are spaced slightly from the wall of said bore, maintaining said blade portion free of direct contact with said mounting, and a source of fluid lubricant in contact with said mounting to impregnate the pores thereof with said lubricant, whereby rotation of said blade at high speeds causes said blade portion to be lightly coated with said lubricant despite the absence of contact therebetween.

6. A spindle as in claim 5 wherein said lubricant source comprises a reservoir filled with said lubricant and a passageway of reduced cross-section compared to said reservoir communicating said reservoir with the outer surface of said porous mounting, at least said passageway being filled with lubricant absorbent fibrous material to retard the flow of lubricant from said reservoir into the pores of said mounting.

7. A spindle as in claim 6 including two of said inserts, each having a bearing face and arranged in said mounting so that planes passed parallel to the axis of rotation of said blade through the loci of contact of the insert faces with said blade portion intersect generally to form a V.

8. A spindle as in claim 7 wherein said insert faces are planar and lie in said intersecting planes.

9. A spindle as in claim 5 wherein said blade is formed with a shoulder portion adjacent said cylindrical portion, and each of said bearing inserts provide at least one face in tangential contact with said shoulder.

10. A high speed textile spindle comprising a housing; a spindle blade having portions journaled in said housing, the surfaces of said portions being surfaces of revolution; spaced bearings in said housing interposed between said spindle blade portions and said housing, each of said bearings comprising a porous mount arranged in said housing and having an axial bore passing therethrough to receive one of said blade portions, the transverse dimension of each bore exceeding that of the corresponding portion; at least one radially extending channel formed in the internal wall of each bore; at least one elongated member for each channel having a wear-resistant bearing face projecting into said bore for contact along its length with the corresponding blade portion to maintain the latter out of contact with the internal surface of the bore, the face of each said member oppositely disposed from said bearing face including a surface of longitudinal convex curvature; and a load distributing strip interposed between each said curved face and the bottom wall of the corresponding channel.

References Cited in the file of this patent

UNITED STATES PATENTS

| | | |
|---|---|---|
| 567,064 | Atwood | Sept. 1, 1896 |
| 2,460,152 | Serra y Sió | Jan. 25, 1949 |
| 2,590,761 | Edgar | Mar. 25, 1952 |
| 2,618,116 | Albrecht | Nov. 18, 1952 |
| 2,753,229 | Queer | July 3, 1956 |
| 2,791,086 | Hilbert et al. | May 7, 1957 |
| 2,829,487 | Stoddard et al. | Apr. 8, 1958 |
| 2,837,889 | Comer | June 10, 1958 |

Dedication 3,044,247.—*Richard G. Hilbert*, Smithfield, R.I. HIGH SPEED FALSE TWISTER SPINDLE AND MACHINE. Patent dated July 17, 1962. Dedication filed Mar. 28, 1969, by the assignee, *Leesona Corporation*.

Hereby dedicates to the Public the entire terminal portion of the term of the patent subsequent to Aug. 20, 1974.

[*Official Gazette July 8, 1969.*]